United States Patent
Klos et al.

(10) Patent No.: US 8,064,437 B2
(45) Date of Patent: *Nov. 22, 2011

(54) AUTOMATED METHOD AND SYSTEM FOR SELECTIVELY UPDATING COMMUNICATIONS PARAMETERS REPRESENTING SUBSCRIBER SERVICES IN TELECOMMUNICATIONS NETWORKS

(75) Inventors: Timothy R. Klos, High Ridge, MO (US); John A. Vallely, Florissant, MO (US); Cynthia P. Green, Carol Stream, IL (US); Rebecca A. Trehy, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 869 days.

This patent is subject to a terminal disclaimer.

(21) Appl. No.: 12/082,432

(22) Filed: Apr. 11, 2008

(65) Prior Publication Data
US 2008/0219245 A1   Sep. 11, 2008

Related U.S. Application Data

(63) Continuation of application No. 10/978,185, filed on Oct. 29, 2004, now Pat. No. 7,379,448.

(51) Int. Cl.
*H04J 12/66* (2006.01)
*H04J 3/16* (2006.01)

(52) U.S. Cl. ........................................ 370/352; 370/465

(58) Field of Classification Search .................. 370/252, 370/352, 401, 465
See application file for complete search history.

(56) References Cited

U.S. PATENT DOCUMENTS

| | | | |
|---|---|---|---|
| 5,434,798 | A | 7/1995 | Madebrink et al. |
| 6,014,715 | A | 1/2000 | Stoevhase |
| 6,272,108 | B1 | 8/2001 | Chapman |
| 6,393,478 | B1 | 5/2002 | Bahlmann |
| 2002/0087580 | A1 | 7/2002 | LaCroix et al. |
| 2002/0144156 | A1 | 10/2002 | Copeland, III |
| 2002/0161867 | A1 | 10/2002 | Cochran et al. |
| 2002/0198967 | A1 | 12/2002 | Iwanojko et al. |
| 2003/0037171 | A1 | 2/2003 | Madineni et al. |
| 2003/0061323 | A1 | 3/2003 | East et al. |
| 2003/0091002 | A1 | 5/2003 | Oliver et al. |
| 2003/0093506 | A1 | 5/2003 | Oliver et al. |
| 2003/0140132 | A1 | 7/2003 | Champagne et al. |
| 2003/0148774 | A1 | 8/2003 | Naghian et al. |
| 2004/0028037 | A1 | 2/2004 | Rasanen et al. |
| 2004/0064555 | A1 | 4/2004 | Cuny et al. |
| 2004/0073600 | A1 | 4/2004 | Elo et al. |
| 2004/0093418 | A1 | 5/2004 | Tuomi |
| 2004/0103125 | A1 | 5/2004 | Kasper, II |
| 2005/0025292 | A1 | 2/2005 | Ganani et al. |
| 2005/0047337 | A1 | 3/2005 | Virtanen |
| 2007/0204050 | A1 | 8/2007 | Liu et al. |

*Primary Examiner* — Andrew Lee
(74) *Attorney, Agent, or Firm* — Brooks Kushman P.C.

(57) ABSTRACT

Methods and systems for updating subscriber service parameters in a communications network wherein a central provisioning unit automatically locates subscriber ports having subscriber service parameters that require updating and automatically issues commands for updating the subscriber service parameters of the ports requiring updating.

20 Claims, 2 Drawing Sheets

AUTOMATED METHOD AND SYSTEM FOR SELECTIVELY UPDATING COMMUNICATIONS PARAMETERS REPRESENTING SUBSCRIBER SERVICES IN TELECOMMUNICATIONS NETWORKS

CROSS-REFERENCE TO RELATED APPLICATIONS

This application is a continuation of U.S. application Ser. No. 10/978,185, filed Oct. 29, 2004, now U.S. Pat. No. 7,379,448, which is hereby incorporated by reference in its entirety.

BACKGROUND OF THE DISCLOSURE

1. Field of the Disclosure

The present disclosure relates to methods and systems for updating subscriber service parameters in a communications network.

2. Background Art

In a data or voice communications network it may be necessary to perform mass-updates that change subscriber services. For data networks, the subscriber service parameters associated with data circuits are typically changed using a Graphical User Interface (GUI) or a Command Line Interface (CLI). When the network serves a moderate number of users, these interfaces are adequate. However, in large networks supporting thousands or millions of subscribers, changing the subscriber service parameters cannot be efficiently done through manual processes using these interfaces.

In a data network that provides Digital Subscriber Line (DSL) services, for example, it may be necessary to perform mass updates based upon a set of specific selection criteria. These criteria may include specific circuits or circuits having a common characteristic. Typical of this type of update is changing Discrete Multi-Tone (DMT) parameters representing DSL characteristics such as data speeds, noise margins, channel interleave delays, power spectral densities, etc., from one set of values to another. The changes may be the result of new services or may be required to enhance network performance.

Because it is not feasible to perform these changes one at a time or in any manual mode using known utilities, a utility is needed that overcomes these deficiencies.

DETAILED DESCRIPTION OF THE PREFERRED EMBODIMENT(S)

Figure 1:
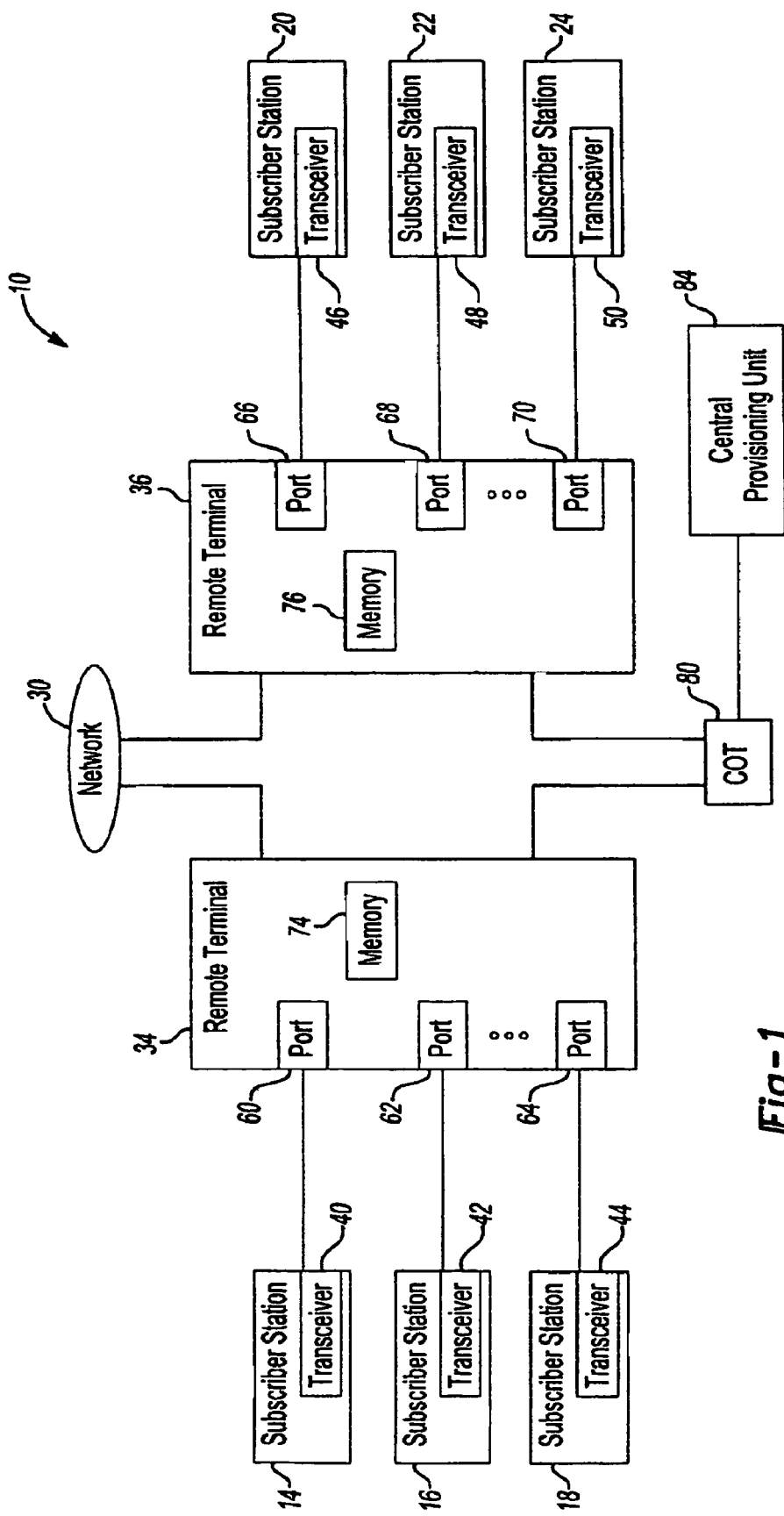
FIG. 1 illustrates a communication system in accordance with one aspect of the present disclosure.

The present disclosure discloses an embodiment of a method for use with stations in communication with a network via a terminal having ports which are respectively associated with the stations and parameters such that each station is associated with a respective port and a respective parameter. Communication between the terminal and each station is conducted through the associated port in accordance with the associated parameter. The method includes extracting the parameters by a provisioning unit in communication with the terminal. The method further includes processing the extracted parameters by the provisioning unit to determine the parameters requiring updating. The method further includes automatically updating the ports associated with the determined parameters with commands issued from the provisioning unit to the terminal such that these ports and thereby the associated stations are associated with updated parameters in place of the determined parameters without requiring manual interaction. The updating of these ports is characterized by updating a first portion of these ports and thereafter updating a different portion of these ports after a predefined period of time.

The present disclosure discloses an embodiment of a provisioning unit for use with stations in communication with a network via a terminal having ports which are respectively associated with the stations and parameters such that each station is associated with a respective port and a respective parameter. Communication between the terminal and each station is conducted through the associated port in accordance with the associated parameter. The provisioning unit configured for extracting the parameters; processing the extracted parameters to determine the parameters requiring updating; and automatically updating the ports associated with the determined parameters by issuing commands to the terminal such that these ports and thereby the associated stations are associated with updated parameters in place of the determined parameters without requiring manual interaction. The updating of these ports is characterized by updating a first portion of these ports and thereafter updating a different portion of these ports after a predefined period of time.

The present disclosure discloses an embodiment of a system having a terminal and a provisioning unit. The terminal is in communication with stations and a network. The terminal includes ports which are respectively associated with the stations and parameters such that each station is associated with a respective port and a respective parameter. Communication between the terminal and each station is conducted through the associated port in accordance with the associated parameter. The provisioning unit is in communication with the terminal. The provisioning unit extracts the parameters, determines which extracted parameters require updating, and automatically updates the ports associated with the determined parameters with commands issued from the provisioning unit to the terminal such that these ports and thereby the associated stations are associated with updated parameters in place of the determined parameters without requiring manual interaction. The updating of these ports is characterized by updating a first portion of these ports and thereafter updating a different portion of these ports after a predefined period of time.

In a system having thousands, if not millions, of subscriber stations, it can be a burden to locate subscriber service parameters associated with the subscriber ports requiring updating. One advantage of the present disclosure is that it ameliorates this problem by providing a central provisioning unit to automatically locate the subscriber ports requiring updating.

Furthermore, in such systems, it can be a burden to update the subscriber service parameters of the subscriber ports requiring updating. One advantage of the present disclosure is that it ameliorates this problem by providing a central provisioning unit to automatically update the subscriber ports requiring updating.

The above features and advantages, along with other features and advantages of the present disclosure, are readily apparent from the following detailed description of the disclosure when taken in connection with the accompanying drawings.

FIG. 1 illustrates a communication system 10 in accordance with one aspect of the present disclosure. System 10
} generally relates to a telephone communication system wherein voice and data services are provided over telephone lines to a number of subscriber stations 14-24.

In more detail, stations 14-24 correspond with subscriber homes, offices, buildings, and the like which receive voice and/or data services from a telephone service provider through a network 30. A number of stations 14-24 are grouped together for servicing with a number of remote terminals 34, 36. Stations 14-24 include one or more transceivers 40-50 or other devices for exchanging signals with terminals 34, 36.

The signals exchanged with terminals 34, 36 may correspond with voice, data, or other types of electronic signals. Each terminal 34, 36 is configured for communication with network 30 so that signals may be communicated between network 30 and stations 14-24 by way of terminals 34, 36.

Network 30 shown in FIG. 1 is generalized as the present disclosure contemplates using terminals 34, 36 to exchange signals with any network. In one aspect of the present disclosure, network 30 may be logically separated into voice and data networks wherein voice signals are exchanged over a voice portion of network 30 and data signals are exchanged over a data portion of network 30. For example, the voice portion of network 30 may correspond with a public telephone switching network (PSTN) and the data portion of network 30 may correspond with a wide area network (WAN), such as the Internet, a local area network (LAN), or other type of data network. For operation with this type of voice and data network, terminals 34, 36 may be configured to separate voice and data signals and route the signals to different exchanges associated therewith. The present disclosure, however, contemplates that terminals 34, 36 may include features, logic, and other items to permit exchanging signals between stations 14-24 and network 30, depending on the type of network employed.

Each terminal 34, 36 includes a port 60-70 for each station 14-24 supported thereby. Ports 60-70 are configured for providing electrical connections between stations 14-24 and terminals 34, 36. Ports 60-70 may be denoted as 'virtual circuits' because their operating characteristics may be programmed by terminals 34, 36 and devices in communication therewith. In particular, the operating characteristics may specify signal rates, voice and data channels, transmission protocols, and other parameters for controlling and operating the exchange of signals between terminals 34, 36 and their associated stations 14-24.

In accordance with one aspect of the present disclosure, the operating characteristics are generally referred to as subscriber service parameters as the subscriber service parameters define the operating characteristics for each port 60-70. For example, a first subscriber station may request data access at a first data rate and a second subscriber station may request data access at a second, different data rate such that the subscribers have different subscriber service parameters as the parameters specify the type of subscriber service requested by the stations. This is common in telecommunication networks where some stations may request high speed data connections while other stations request less than high speed data connections.

Memories 74, 76 or other devices are included on terminals 34, 36 for storing the operating parameters associated with ports 60-70. Memories 74, 76 include a table or other accessible data compilation for each port 60-70 so that a processor or other feature on terminals 34, 36 may access memories 74, 76 to determine the operating parameters for each port 60-70. Memories 74, 76 are segmented or otherwise assignable to each port 60-70 so that different ports 60-70 on the same terminal 34, 36 may include different operating parameters. Terminals 34, 36 construct the virtual circuits according to the operating characteristics stored on memories 74, 76. The present disclosure, however, contemplates that memories 74, 76 may be located remotely from terminals 34, 36, such as on a database, such that terminals 34, 36 must access the database or receive instructions from another device in communication with the database to receive the operating characteristics for ports 60-70.

System 10 further includes at least one central office terminal (COT) 80. COT 80 is a communication medium of the telecommunications system provider or other provider of system 10 that provides command and control of terminals 34, 36. In some environments, terminals 34, 36 are provided by one or more vendors such that the telecommunications system provider uses COT 80 to provide command and control signals to the terminals according to the control architecture of the vendor associated therewith. Likewise, some terminals may include legacy configurations or different configurations than some of the other terminals such that COT 80 may be used to provide the command and control signals required for commanding and control these terminals.

In general, a single COT 80 supports a number of remote terminals 34,36, typically by geographical area. Terminals 34, 36 in turn support a greater number of subscriber stations 14-24 so that a centralized architecture is provided by way of COTs 80 and terminals 34, 36 for supporting any number of subscribers. In particular, system 10 may comprise a large geographical area, such as the United States, and include a number of COTs 80 to support a larger number of terminals 34, 36 which support a larger number of stations 14-24, such as the millions of subscriber stations in the United States.

In accordance with one aspect of the present disclosure, each COT 80 communicates with a central provisioning unit 84. Provisioning unit 84 is a source for command and control of COTs 80, and thereby terminals 34, 36. Provisioning unit 80 is configured to set the subscriber service parameters for each port 60-70 from a centralized location without requiring manual interaction or specification of ports 60-70. COT 80 is a unit provided by the vendor of COT 80 for supporting operation of terminals 34, 36.

System 10 may include any number of stations 14-24, terminals 34, 36, and COTs 80. To facilitate command and control, each of these items includes an identifying address or other feature for addressing signals thereto. Each COT 80 is assigned an Internet Protocol (IP) address, each terminal 34, 36 is assigned a terminal identification (TID) address, each port 60-70 is assigned an access identifier (AID), and each station 14-24 is addressed a subscriber station identification (SSID) address.

System 10, as described above, relates to a telecommunications system wherein telephone lines deliver signals between terminals 34, 36 and stations 14-24. The present disclosure, however, is not so limited. Rather, the present disclosure contemplates any number of communication mediums for exchanging signals, including, RF and satellite wireless systems, cable systems, and the like. In addition, the present disclosure is not limited to a system having both voice and data capabilities as a system having only data capabilities is contemplated.

Figure 2:
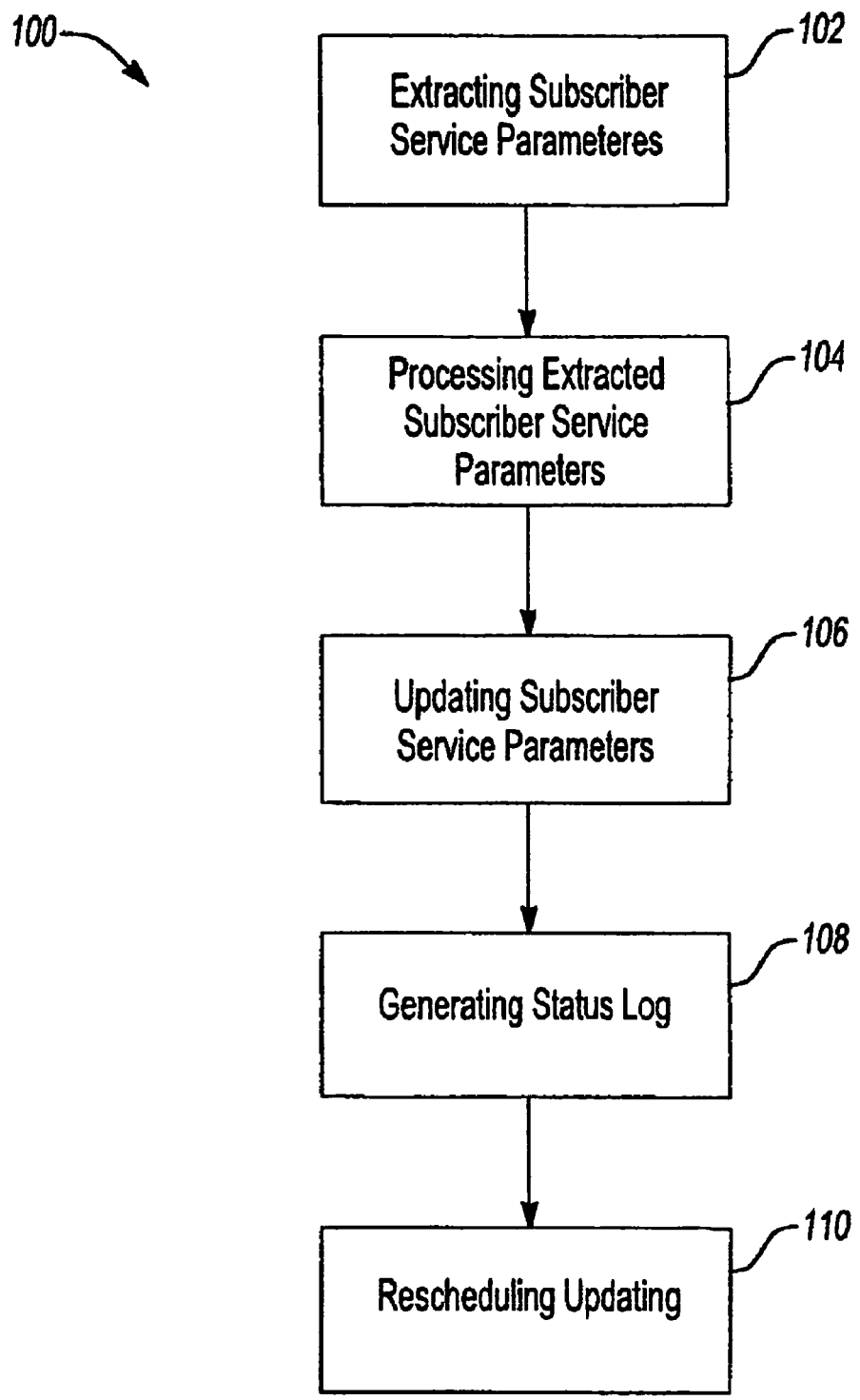
FIG. 2 illustrates a flowchart of a method for updating subscriber services in accordance with one aspect of the present disclosure.

FIG. 2 illustrates a flowchart 100 of a method for updating subscriber services in accordance with one aspect of the present disclosure. The method is advantageous for limiting manual interaction and other labor intensive operations previously required for updating subscriber service parameters. In more detail, the method generally relates to a method for executing a software program or other logic from a central provisioning unit for independently updating subscriber service parameters by updating ports in a remote terminal.

Block 102 relates to extracting subscriber service parameters for one or more subscriber stations. As described above, the subscriber service parameters specify the operating parameters for the ports associated with the stations so as to define the virtual circuits between each station and its associated remote terminal, such as to define its data transfer rate.

The subscriber service parameters are automatically extracted by the provisioning unit according to extraction criteria. The extraction criteria is inputted to the provisioning unit by a user or provided thereto by another entity. The extraction criteria may specify any number or parameters, such as data transfer rates, data transfer protocols, and identifying address, such as the IP, TID, AID and/or SSID addresses assigned to each item in the system.

After receipt of the extraction criteria, the provisioning unit automatically determines the subscriber stations matching the extraction criteria and determines the subscriber service parameters and other data associated therewith for each of the matching stations, such as its address and the address of the port, remote terminal, and COT associated therewith. In addition, other pieces of data may be retrieved for each subscriber station, such as device type information. The device type information specifies protocol instructions and other parameters for the port that are required for communication with the stations, which may be advantageous in a system having remote terminals supplied by a number of vendors or remote terminals with different control architectures.

The data may be extracted in a number of operations. In accordance with one aspect of the present disclosure, the provisioning unit includes a provisioning database having the subscriber service parameters and addresses associated with each subscriber such that the database is scanned to locate subscriber stations matching the extraction criteria. In accordance with another aspect of the present disclosure, the provisioning unit may poll the system, such as by polling the memories of the remote terminals to locate subscriber stations matching the extraction criteria.

Block 104 relates to processing the extracted subscriber service parameters in the provisioning unit. The processing of the extracted subscriber service parameters generally relates to comparing the extracted subscriber service parameters to an updated set of subscriber service parameters, generally referred to as updated subscriber service parameters.

If the extracted subscriber service parameters fail to match the updated subscriber service parameters, the subscriber station associated therewith requires updating of its subscriber service parameters, i.e. the operating characteristics of its port, so that the subscriber service parameters match. There are any number of reasons for updating or changing the subscriber service parameters, such as in response to system upgrades and/or customer requests.

In a system having thousands, if not millions, of subscriber stations, it can be a burden to locate the subscriber service parameters of the subscriber ports requiring updating. The present disclosure ameliorates this problem by providing the provisioning unit to automatically locate the subscriber ports requiring updating, i.e., by locating the subscriber stations ports having subscriber service parameters that fail to match the extraction criteria.

Block 106 relates to automatically updating the subscriber service parameters of the subscriber port requiring updating. The updating of the subscriber service parameter generally relates to the provisioning unit issuing commands therefrom to the terminals associated with the subscriber ports requiring updating.

The updating commands include instructions provided by the provisioning unit that specify the subscriber service parameters which require updating and/or the instructions may define where the updated subscriber service parameters may be located. For example, if the instructions include the updated subscriber service parameters, the remote terminals simply read the instructions for the updated subscribe service parameters and make the corresponding adjustments. If, however, the instructions merely specify where the updated parameters are stored, such as on a system database, the terminals must contact the system database themselves to determine the updated subscriber service parameters, or the system database may initiate communication with the terminals to facilitate migration of the parameters to the terminals.

The provisioning unit is configured to output the updating instructions according to different protocols so that the provisioning unit may support multiple types of remote terminals. The extracted subscriber service parameters include device type information and/or other data for assisting the provisioning unit in formatting and constructing the updating commands into protocols understood by the various terminals. In some cases, the provisioning unit may need to issue multiple updating commands to support the various protocols, i.e., if a single COT supports terminals having different control architectures.

The commands may be issued in a number of different operations. In one aspect of the present disclosure, the commands are grouped according to the identifying addresses. For example, if multiple subscriber stations are associated with the same IP address, i.e. the subscriber stations are serviced by the same COT, the provisioning unit issues commands in a single telnet session with the corresponding COT for updating the subscriber service parameters of the associated subscriber stations. In this manner, the number of commands issued to each COT may be limited so as to limit command traffic and unnecessary overlap. The updating commands are addressable from the COT to individual AIDs addresses of the ports so that each port on each terminal may be independently updated, i.e. without requiring all ports on the terminals to be updated. However, the present disclosure is not limited to grouping the ports for updating and contemplates that the ports may be updated in a different manner, including issuing signals to each terminal and/or port address.

In accordance with one aspect of the present disclosure, the ports on each remote terminal having more than one port requiring updating are sequentially updated if the number of ports requiring updating exceeds the number of ports that may be updated at one time. In more detail, the terminal may be limited to updating only a portion of the ports at one time, generally due to processing restrictions. As such, the provisioning unit issues commands for sequentially updating the terminal by issuing a first set of updating commands, and after a predefined period of time, issuing another second set of updating commands. The predefined period of time is selected by the provisioning unit to correspond with an update processing time of the terminal such that the first portion of ports are completely updated according to the first set of updating signals prior to beginning the updating the second portion of the ports with the second set of updating commands.

In accordance with one aspect of the present disclosure, ports may be omitted from the automatic updating according to omission criteria. The omission criteria is inputted into the provisioning unit by a user or other entity in communication therewith. It may include any number of parameters, such as those described above with respect to the extraction criteria, and other parameters. The other parameters are ascertained by the provisioning unit scanning a database of pending updates and hardware issues. In more detail, the provisioning unit preferably logs all updating operations and hardware issues in a database so that it may be consulted to determine the status of each subscriber station. In some cases wherein thousands or millions of subscriber ports are being updated, a request for updating the subscriber ports may be instigated before previous updates are complete such that the previous updates are still pending. The present disclosure notes the pending updates and eliminates them from subsequent updates. In addition, the present disclosure consults the database to determine remote terminals and COTs having hardware issues or problems and eliminates these from updating until they are back online.

In a system having thousands, if not millions, of subscriber stations, it can be a burden to update the subscriber service parameters of the subscriber ports requiring updating. The present disclosure ameliorates this problem by providing the provisioning unit to automatically update the subscriber ports requiring updating.

Block 108 relates to generating a status log for the subscriber stations. The status log is stored on a status database which communicates with the provisioning unit. In accordance with one aspect of the disclosure, the status log is generated by the provisioning unit polling the ports in the system and storing the subscriber service parameters associated therewith to determine its current subscriber service parameters so that these parameters may then be compared to the update parameters to determine if the subscriber service parameters were successfully updated. In yet another aspect of the disclosure, the status log is updated when any update command fails to successfully perform its intended function. If the parameters fail to match, then an error log database of the provisioning unit is updated with an error message to reflect the discrepancy. If the parameters match, the status log is also updated to indicate the matching status.

Block 110 relates to rescheduling updating of the subscriber service parameters for the ports having an error log recorded in the status log. The subscriber service parameters are updated in the manner described above. The rescheduling is automatically scheduled to occur after a predefined period of time passes once the updating in block 106 is complete.

While embodiments of the present disclosure have been illustrated and described, it is not intended that these embodiments illustrate and describe all possible forms of the present disclosure. Rather, the words used in the specification are words of description rather than limitation, and it is understood that various changes may be made without departing from the spirit and scope of the present disclosure.

What is claimed is:

1. A method for use with stations in communication with a network via a terminal having ports which are respectively associated with the stations and parameters such that each station is associated with a respective port and a respective parameter, wherein communication between the terminal and each station is conducted through the associated port in accordance with the associated parameter, the method comprising:
   extracting the parameters by a provisioning unit in communication with the terminal;
   processing the extracted parameters by the provisioning unit to determine the parameters requiring updating; and
   automatically updating the ports associated with the determined parameters with commands issued from the provisioning unit to the terminal such that these ports and thereby the associated stations are associated with updated parameters in place of the determined parameters without requiring manual interaction, wherein updating these ports is characterized by updating a first portion of these ports and thereafter updating a different portion of these ports after a predefined period of time.

2. The method of claim 1 wherein the parameters specify operating characteristics of the ports associated therewith, wherein:
   updating the ports associated with the determined parameters includes updating the operating characteristics associated with these ports.

3. The method of claim 1 further comprising:
   selectively determining the ports for updating the parameters associated therewith.

4. The method of claim 1 wherein:
   updating the ports associated with the determined parameters includes selectively issuing commands from the provisioning unit to the terminal for independently updating selected ports.

5. The method of claim 1 wherein:
   processing the extracted parameters to determine parameters requiring updating includes determining which extracted parameters fail to match updated parameters.

6. The method of claim 1 wherein the terminal stores a profile for each associated station and port which specifies the parameter associated therewith, wherein:
   issuing the commands from the provisioning unit to the terminal for automatically updating the ports associated with the determined parameters includes issuing commands from the provisioning unit to the terminal for updating the profiles which specify the determined parameters.

7. The method of claim 1 wherein a database associated with the terminal includes a profile for each associated station and port which specifies the parameter associated therewith, wherein:
   issuing the commands from the provisioning unit to the terminal for automatically updating the ports associated with the determined parameters includes issuing commands from the provisioning unit to the terminal to retrieve from the database the profiles which specify the determined parameters in order to update the determined parameters.

8. The method of claim 1 further comprising:
   extracting an element type for each station associated with a determined parameter; and
   selecting a provisioning protocol for the updated parameter to replace the determined parameter based on the element type of the station associated with the determine parameter.

9. The method of claim 1 further comprising:
   determining ports to omit from updating if updates are pending for the ports.

10. The method of claim 1 further comprising:
    determining ports to omit from updating if the ports meet omission criteria.

11. The method of claim 1 further comprising:
    issuing commands from the provisioning unit to the terminal for determining whether the updating of the ports is successful.

12. The method of claim 11 further comprising:
    generating an error log at the processing unit for ports having unsuccessful updates; and
    re-scheduling updating of the ports specified in the error log.

13. A provisioning unit for use with stations in communication with a network via a terminal having ports which are respectively associated with the stations and parameters such that each station is associated with a respective port and a respective parameter, wherein communication between the terminal and each station is conducted through the associated port in accordance with the associated parameter, the provisioning unit configured for:

extracting the parameters;

processing the extracted parameters to determine the parameters requiring updating; and automatically updating the ports associated with the determined parameters by issuing commands to the terminal such that these ports and thereby the associated stations are associated with updated parameters in place of the determined parameters without requiring manual interaction, wherein updating these ports is characterized by updating a first portion of these ports and thereafter updating a different portion of these ports after a predefined period of time.

14. The provisioning unit of claim 13 wherein the parameters specify operating characteristics of the ports associated therewith, wherein the provisioning unit is further configured for:

updating the ports associated with the determined parameters by changing the operating characteristics associated with these ports.

15. The provisioning unit of claim 13 wherein the provisioning unit is further configured for:

determining which extracted parameters fail to match updated parameters to determine which parameters require updating.

16. A system comprising:

a terminal in communication with stations and a network, wherein the terminal includes ports which are respectively associated with the stations and parameters such that each station is associated with a respective port and a respective parameter, wherein communication between the terminal and each station is conducted through the associated port in accordance with the associated parameter; and a provisioning unit in communication with the terminal, wherein the provisioning unit extracts the parameters, determines which extracted parameters require updating, and automatically updates the ports associated with the determined parameters with commands issued from the provisioning unit to the terminal such that these ports and thereby the associated stations are associated with updated parameters in place of the determined parameters without requiring manual interaction, wherein updating these ports is characterized by updating a first portion of these ports and thereafter updating a different portion of these ports after a predefined period of time.

17. The system of claim 16 wherein the parameters specify operating characteristics of the ports associated therewith, wherein:

the commands issued from the provisioning unit to the terminal update the ports associated with the determined parameters by updating the operating characteristics associated with these ports.

18. The system of claim 16 wherein:

the provisioning unit processes the extracted parameters to determine parameters requiring updating by determining which extracted parameters fail to match updated parameters.

19. The system of claim 16 wherein:

the terminal is associated with a database which includes a profile for each associated station and port which specifies the parameter associated therewith;

wherein the commands issued from the provisioning unit to the terminal for automatically updating the ports associated with the determined parameters includes commands to retrieve from the database the profiles which specify the determined parameters in order to update the determined parameters.

20. The system of claim 16 wherein:

the provisioning unit is operable to determine ports to omit from updating.

* * * * *